(12) United States Patent
Sun et al.

(10) Patent No.: US 8,667,086 B2
(45) Date of Patent: Mar. 4, 2014

(54) METHOD, DEVICE, AND SYSTEM FOR DOWNLOADING GAMES

(75) Inventors: Guangcheng Sun, Shenzhen (CN); Min Zhao, Shenzhen (CN); Xian Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/990,051

(22) PCT Filed: Nov. 28, 2011

(86) PCT No.: PCT/CN2011/083081
§ 371 (c)(1),
(2), (4) Date: May 29, 2013

(87) PCT Pub. No.: WO2012/072016
PCT Pub. Date: Jun. 7, 2012

(65) Prior Publication Data
US 2013/0254274 A1    Sep. 26, 2013

(30) Foreign Application Priority Data

Nov. 29, 2010 (CN) .......................... 2010 1 0563318

(51) Int. Cl.
*G06F 15/16* (2006.01)
*G06F 12/00* (2006.01)
(52) U.S. Cl.
USPC .......................................... 709/217; 717/168
(58) Field of Classification Search
USPC .................. 709/217–219, 223–229, 250; 717/168–172
See application file for complete search history.

(56) References Cited

U.S. PATENT DOCUMENTS 6,544,126 B2 * 4/2003 Sawano et al. ................... 463/42
6,769,019 B2 * 7/2004 Ferguson ....................... 709/219
(Continued)

FOREIGN PATENT DOCUMENTS

| CN | 101483556 A | 7/2009 |
| CN | 101626391 A | 1/2010 |
| CN | 101808157 A | 8/2010 |

OTHER PUBLICATIONS

International Search Report in International Application No. PCT/CN2011/083081, mailed on Mar. 8, 2012.

(Continued)

*Primary Examiner* — Zarni Maung
(74) *Attorney, Agent, or Firm* — Oppedahl Patent Law Firm LLC

(57) ABSTRACT

The present disclosure applies to the field of software, and provides a method, a device and a system for downloading games. The method includes that: after a user logs in, a client device sends a version number of a local game hall and personal information of the user to a server, which generates and returns a silent configuration file for downloading according to the version number of the local game hall and personal information of the user, wherein the silent configuration file for downloading includes a list of games that needs to be updated and/or downloaded and a silent download speed-limiting mode; the client device receives the silent configuration file for downloading returned by the server, and silently downloads and/or updates corresponding games of the local game hall according to the silent configuration file for downloading. An embodiment of the present disclosure can set the most appropriate silent download mode according to network conditions and user requirements.

5 Claims, 4 Drawing Sheets

(56) References Cited

U.S. PATENT DOCUMENTS

| | | |
|---|---|---|
| 6,996,817 B2 | 2/2006 | Birum et al. |
| 7,887,420 B2 * | 2/2011 | Nguyen et al. ............... 463/42 |
| 8,131,797 B2 * | 3/2012 | Joo et al. .................... 709/201 |
| 8,131,829 B2 * | 3/2012 | Deng ........................... 709/221 |
| 8,187,099 B2 * | 5/2012 | Taho et al. .................. 463/42 |
| 8,337,301 B2 * | 12/2012 | Topham et al. ............. 463/29 |
| 2003/0221189 A1 | 11/2003 | Birum et al. |

OTHER PUBLICATIONS

English Translation of the Written Opinion of the International Search Authority in international application No. PCT/CN2011/083081, mailed on Mar. 8, 2012.

* cited by examiner

Prior Art

METHOD, DEVICE, AND SYSTEM FOR DOWNLOADING GAMES

CROSS-REFERENCE TO RELATED APPLICATIONS

This application is a national stage entry of PCT/CN2011/083081, filed on Nov. 28, 2011, which claims priority to CN 201010563318.2, filed Nov. 29, 2010, each of the disclosures of which are hereby incorporated by reference in their entirety.

TECHNICAL FIELD

The present disclosure relates to download a software, and in particular to a method for downloading games, and associated device and system.

BACKGROUND

It might be known in the art and is noted in this application a game hall represents a game platform for integrating games (such as recreational games) and for allowing user to access to games. The game hall itself cannot be treated as a game.

Clients manipulated by users, after logging on the game hall, may be in an idle condition without selecting and joining in any games, and/or without initiating any active actions such as actions of initiative downloading. In this application, initiative downloading refers to actions initiated by users of clients to download software, messages, or other audio or video information. Silent downloading differs from initiative downloading at least in that the game platform can automatically download games to the client without being requested by the clients. The silent downloading can be implemented when the client is in the idle condition.

Typically, according to requests by clients to the game platform, corresponding games can be downloaded and installed locally for playing. If the local games cannot technically match with the game hall, redownloading and reinstallation may be required for playing the games.

As shown in FIG. 1, a corresponding method includes steps as follows.

S101: receiving client login information and a command to start a game;

S102: determining whether the game is installed; if not, go to S103; and if yes, go to S104;

S103: downloading a game from a server;

S104: determining whether the game needs to be updated, if yes, go to S105; and if not, go to S106;

S105: downloading update documents from the server;

S106: launching the client to start the game.

The downloading process of the game (see S103, S105) can only be initiated and implemented by the client for example through clicks on corresponding buttons. Therefore, the client often has to wait until the game is downloaded and installed. If a second game needs to be downloaded and installed during playing a first game, the downloading and installing process is prone to deteriorate experience of the first game.

SUMMARY

The embodiments of the present disclosure provide a method, a device and a system for downloading a game, so as to solve the problem in the relevant art of the influence of the need for initiative game download on a game in progress.

According to an aspect of the present disclosure, the method includes the steps of:

after a user logs in, sending, by a client, a version number of a local game hall and personal information of the user to a server, so that the server generates and returns a silent configuration file for downloading according to the version number of the local game hall and the personal information of the user, wherein the silent configuration file for downloading comprises a list of games that needs to be updated and/or downloaded and a silent download speed-limiting mode; and receiving, by the client, the silent configuration file for downloading returned by the server, and silently downloading and/or updating, by the client, a game of the local game hall according to the silent configuration file for downloading.

According to a further aspect of the present disclosure, the method includes the steps of:

receiving personal information of a user and a version number of a local game hall sent by a client;

generating a silent configuration file for downloading according to the version number of the local game hall and the personal information of the user, wherein the silent configuration file for downloading comprises a list of games that needs to be updated and/or downloaded and a silent download speed-limiting mode; and returning the silent configuration file for downloading back to the client.

According to a further aspect of the present disclosure, the method includes the steps of:

after a user logs in, sending, by a client, a version number of a local game hall and personal information of the user to a server;

generating and returning, by the server, a silent configuration file for downloading according to the version number of the local game hall and the personal information of the user, wherein the silent configuration file for downloading comprises a list of games that needs to be updated and/or downloaded and a silent download speed-limiting mode; and receiving, by the client, the silent configuration file for downloading returned by the server, and silently downloading and/or updating, by the client, a game of the local game hall according to the silent configuration file for downloading.

According to a further aspect of the present disclosure, the device includes:

a game information sending module configured to upload a version number of a local game hall and personal information of the user to a server;

a configuration file for downloading receiving module configured to receive the silent configuration file for downloading sent by the server;

a game verification module configured to perform verification on a local game according to the silent configuration file for downloading received by the configuration file for downloading receiving module; and a game processing module configured to update and/or download the local game according to the result of the verification performed by the game verification module.

According to a further aspect of the present disclosure, the server device includes:

a game information receiving module configured to receive personal information of a user and a version number of a local game hall sent by a client;

a configuration file for downloading generating module configured to generate a silent configuration file for downloading according to the version number of the local game hall and the personal information of the user received by the game information receiving module, wherein the silent configuration file for downloading comprises a list of games that needs to be updated and/or downloaded and a silent download speed-limiting mode; and a configuration file for downloading sending module configured to issue the silent configuration file for downloading generated by the configuration file for downloading generating module to the client.

According to a further aspect of the present disclosure, a system for downloading a game includes at least one client device as is described above and one server device as is described above.

In the embodiments, the server can generate a configuration file for downloading based on personal information of a user and a version number of a local game hall sent by a client. The client implements in a silent download mode to automatically update and/or download a game to the local game hall. In this mode, a download list can be automatically generated on the basis of the personal information, and the game can be silent downloaded. In addition, the silent download mode can be adjusted to maximize its downloading capability according to network conditions and user requirements.

DETAILED DESCRIPTION

The present disclosure is elaborated further in combination with the figures and embodiments, so as to manifest the objective, technical solution and advantage of the present disclosure. It should be understood that an embodiment described herein is merely intended to explain the present disclosure instead of limiting the present disclosure.

In the embodiments, the server can generate a configuration file for downloading based on personal information of a user and a version number of a local game hall sent by a client. The client implements in a silent download mode to automatically update and/or download a game to the local game hall. In this mode, a download list can be automatically generated on the basis of the personal information, and the game can be silent downloaded. In addition, the silent download mode can be adjusted to maximize its downloading capability according to network conditions and user requirements.

Figure 2:
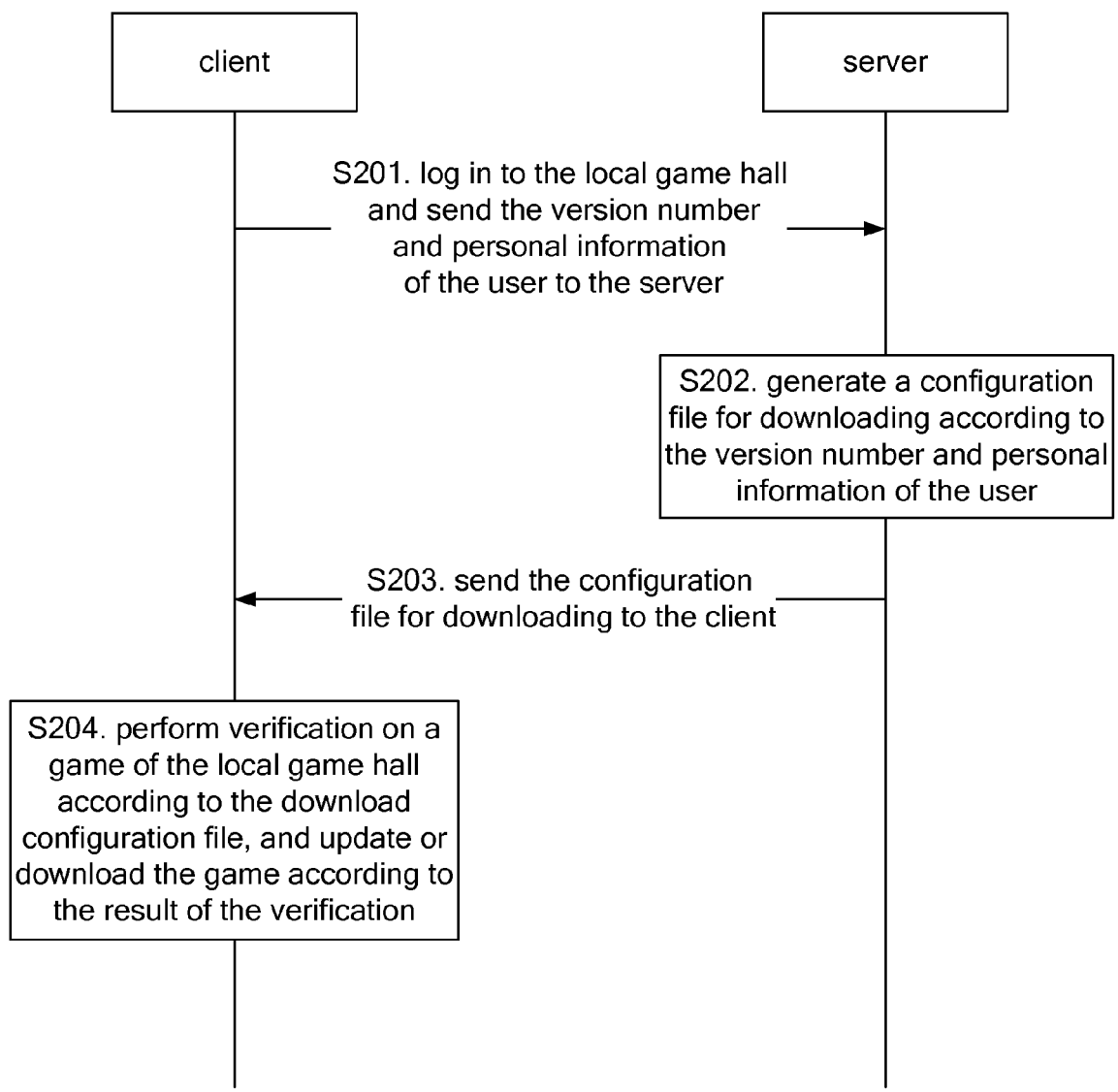
FIG. 2 is a flowchart illustrating a method for downloading a game according to an embodiment of the present disclosure.

A method for downloading a game according to an exemplary embodiment as shown in FIG. 2 is elaborated as follows.

At S201, a client device receives login information of a user, and automatically uploads personal information of the user and the version number of a local game hall to a server.

At S202, the server generates a silent configuration file for downloading according to the personal information of the user and the version number of the local game hall uploaded by the client device. The silent configuration file for downloading includes a list of games that needs to be updated and/or downloaded and a silent download speed-limiting mode.

In some embodiments of the present disclosure, the server determines games supported by the game hall of the current version according to the received current version of the local game hall, determines a game that the user recently participates in online according to the personal information of the user, and ultimately generates the list of games that needs to be updated and/or downloaded.

At S203, the server sends the silent configuration file for downloading to the client device.

At S204, the client device performs verification on games of the local game hall according to the silent configuration file for downloading sent by the server. According to the verification, the corresponding games resided in the local game hall can be updated, and in additional, be re-downloaded.

Figure 3:
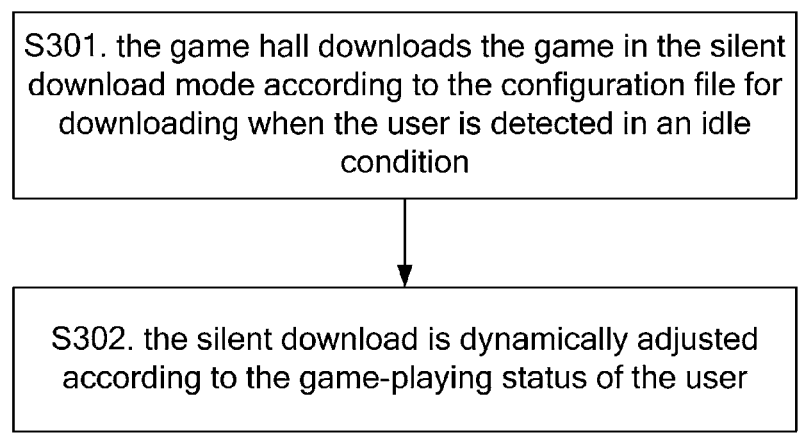
FIG. 3 is a flowchart illustrating S204 shown in FIG. 2 according to an embodiment of the present disclosure.

In the embodiments of the present disclosure, the server sends the generated silent configuration file for downloading to the local game hall, which updates and/or downloads a local game according to the list of games in the silent configuration file. Specific steps for downloading a game are shown in FIG. 3 and subsequent description of FIG. 3, and are not elaborated herein.

In the embodiments of the present disclosure, the game server generates the silent configuration file based on the personal information of the user and the current version number uploaded by the local game hall and sends the silent configuration file for downloading to the local game hall, which updates and/or downloads a local game according to the silent configuration file.

In one or more embodiments, referring to FIG. 3, the sub-steps of S204 (FIG. 2) are illustrated as follows:

S301: when the user is detected in an idle condition, the client device downloads the corresponding games in the silent download mode according to the silent configuration file.

In some embodiments, the step of acquiring the silent configuration file is automatically implemented through a background application after the user logins on the local game hall. If the user is in an idle condition, the corresponding games can be downloaded according to the silent configuration file.

S302: the silent download can be dynamically adjusted according to the game-playing status of the user, which may include the following scenarios of:

a) downloading the game at a full speed when the user is in an idle condition;

b) immediately suspending ongoing silent download and ensuring an initiative download to complete when the user triggers an initiative download;

c) downloading games by using a narrower bandwidth according to the silent download speed-limiting mode when the user is playing games, ensuring fluency of playing the game. The bandwidth may be narrowed to be 5%~10% of the actual bandwidth; or d) restoring the silent download when the user cancels/finishes an initiative download or ends playing of the game.

In another embodiment of the present disclosure, limitations to the speed of the silent download are realized by controlling the speed with which the Transmission Control Protocol (TCP) receives a data package. When the local game hall limits the speed with which a data package is received, the server automatically adjusts the speed with which a data package is sent according to the TCP. The silent download speed-limiting mode may specifically include examples of:

(1) setting a maximum download speed, namely, the maximum speed set by the local game hall, with which a data package is received via the TCP connection;

(2) setting an occupation ratio of bandwidth, namely, downloading at first for a period of time without speed limits to detect a maximum download speed that is currently available, and further setting a silent download speed according to the maximum download speed and the occupation ratio of bandwidth; and (3) setting a download completion time, namely, setting the silent download speed according to file size to be downloaded and download completion time.

The embodiments of the present disclosure provide different speed-limiting modes. The most appropriate silent download speed-limiting mode may be selected according to requirements of the user and the local network condition.

Figure 1:
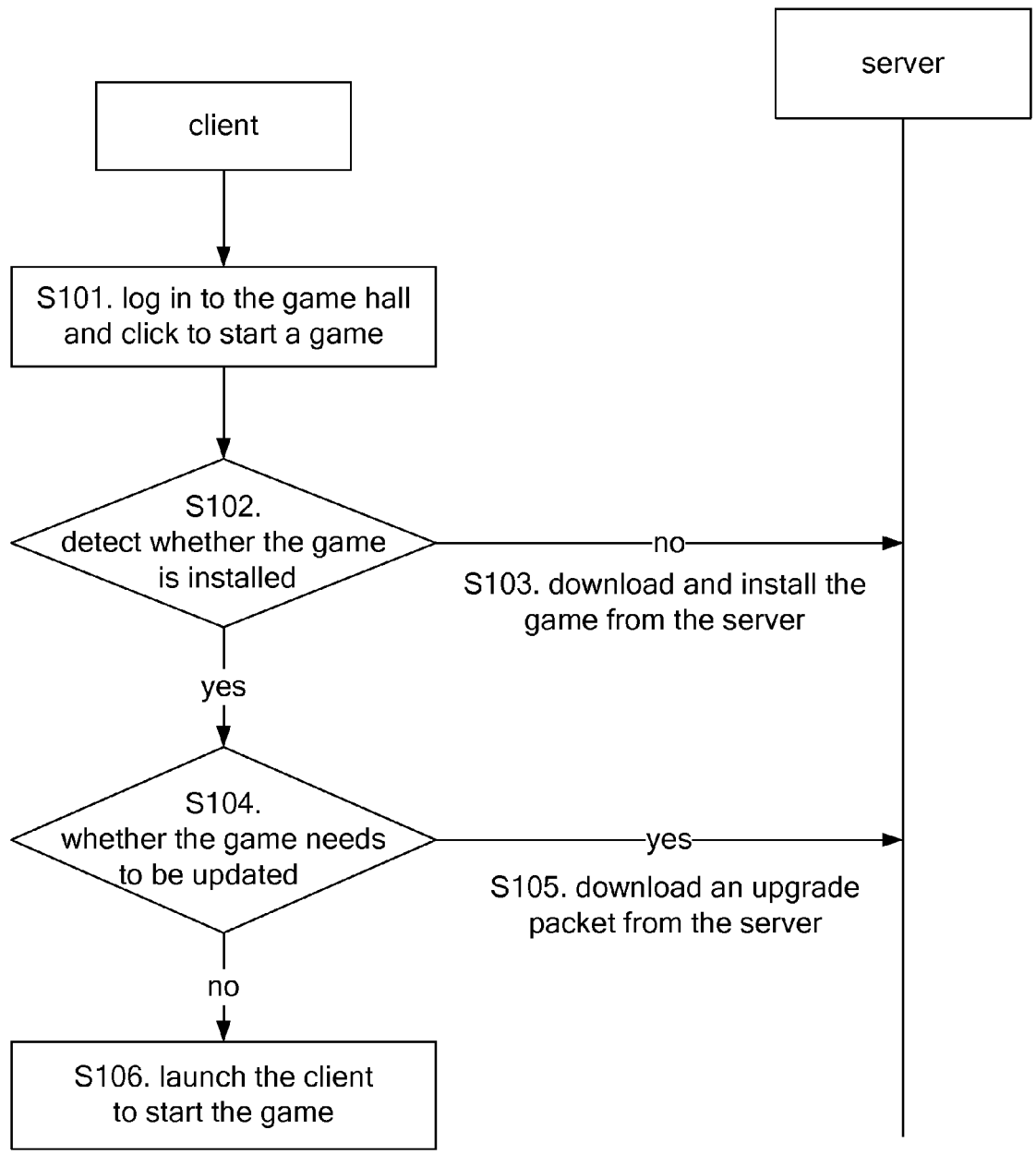
FIG. 1 is a flowchart illustrating a method for downloading a game according to the relevant art.
Figure 4:
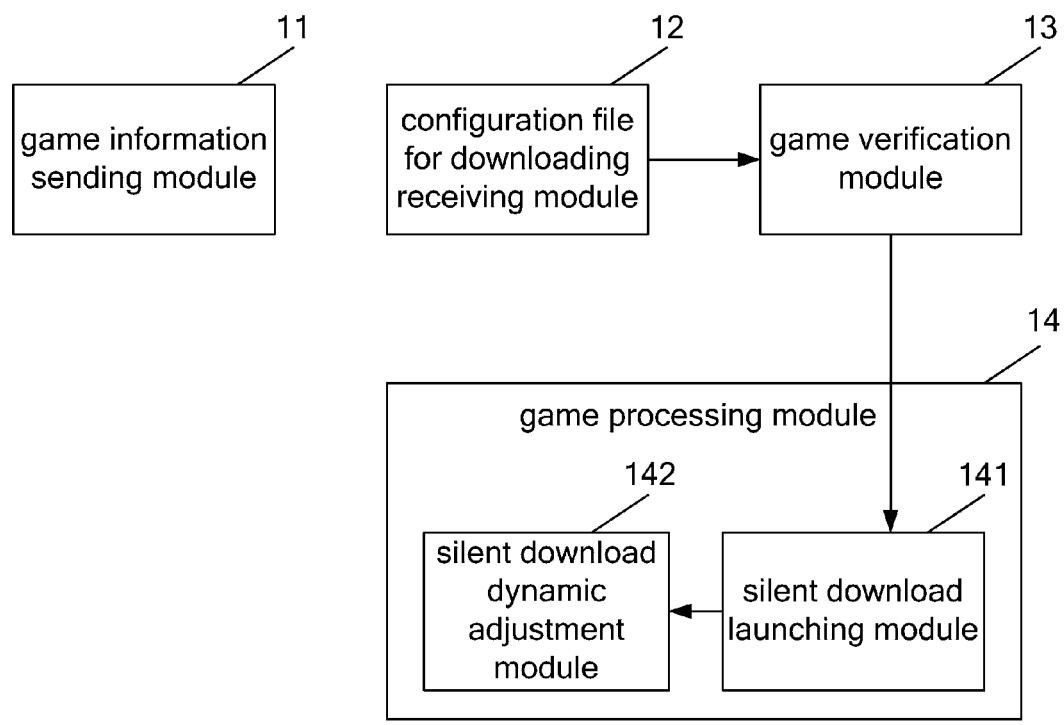
FIG. 4 is a view showing a client-side device associated with the method shown in FIG. 2 according to an embodiment of the present disclosure.

FIG. 4 is an illustrative view of a client device for downloading a game associated with the method shown in FIGS. 1 through 3. The device includes the following modules.

A game information sending module 11 is provided and is configured to upload a version number of a local game hall and personal information of a user to a server;

A configuration file for downloading receiving module 12 is provided and is configured to receive the silent configuration file for downloading sent by the server;

A game verification module 13 is provided and is configured to perform verification on a local game according to the silent configuration file for downloading received by the configuration file for downloading receiving module 12; and A game processing module 14 is provided and is configured to update and/or download the local game according to the result of the verification performed by the game verification module 13.

The game processing module 14 further includes:

a silent download launching module 141 configured to launch a silent download mode to download the game according to the result of the verification performed by the game verification module 13 when the user is in an idle condition;

a silent download dynamic adjustment module 142 configured to perform a dynamic adjustment of the silent download mode according to a game-playing status of the user when the silent download launching module 141 launches the silent download mode to download the game.

The dynamic adjustment of the silent download mode according to the game-playing status of the user may specifically include the following scenarios of:

a) downloading the game at a full speed when the user is in an idle condition;

b) immediately suspending ongoing silent download and ensuring an initiative download to complete when the user triggers an initiative download;

c) downloading games by using a narrower bandwidth according to the silent download speed-limiting mode when the user is playing games, ensuring fluency of playing the game. The bandwidth may be narrowed to be 5%~10% of the actual bandwidth; or d) restoring the silent download when the user cancels/finishes an initiative download or ends playing of the game.

The silent download speed-limiting mode may specifically include examples of:

(1) setting a maximum download speed, namely, the maximum speed set by the local game hall, with which a data package is received via the TCP connection;

(2) setting an occupation ratio of bandwidth, namely, downloading at first for a period of time without speed limits to detect a maximum download speed that is currently available, and further setting a silent download speed according to the maximum download speed and the occupation ratio of bandwidth; and (3) setting a download completion time, namely, setting the silent download speed according to file size to be downloaded and download completion time.

Figure 5:
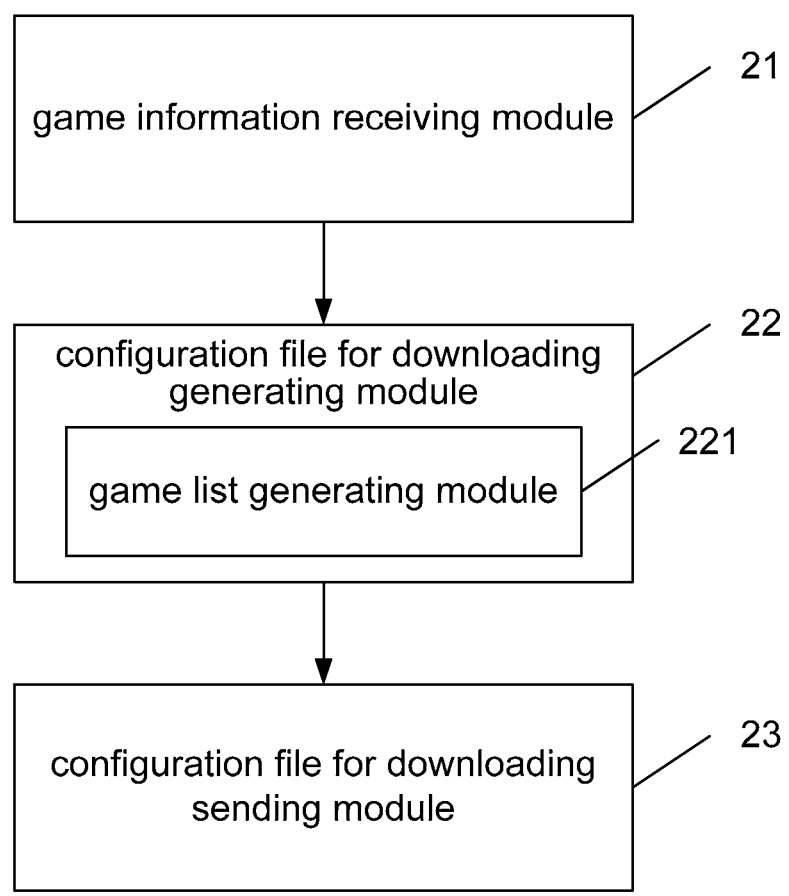
FIG. 5 is a view depicting a server-side device associated with the method shown in FIG. 2 according to an embodiment of the present disclosure.

FIG. 5 is a view of a device for downloading a game by a server provided by an embodiment of the present disclosure, for convenience of description, only the portion relevant to the embodiment of the present disclosure is shown. The device includes:

a game information receiving module 21 configured to receive personal information of a user and a version number of a local game hall sent by a client device;

a configuration file for downloading generating module 22 configured to generate a silent configuration file for downloading according to the version number of the local game hall and the personal information of the user received by the game information receiving module 21, wherein the silent configuration file for downloading comprises a list of games that needs to be updated and/or downloaded and a silent download speed-limiting mode, wherein the configuration file for downloading generating module 22 further includes a game list generating module 221 configured to let the server determine games supported by the game hall of the current version according to the received current version of the local game hall, determine a game that the user recently participates in online according to the personal information of the user, and ultimately generate the list of games that needs to be updated and/or downloaded; and a configuration file for downloading sending module 21 configured to send the silent configuration file for downloading generated by the configuration file for downloading generating module 22 to the client device.

In an embodiment of the present disclosure, a server generates a silent configuration file for downloading according to personal information of a user and a version number of a local game hall sent by a client device, the client device updates and/or downloads a game to the local game hall using a silent download mode. The present disclosure can not only automatically generates a download list based on the personal information and perform the silent download, but select the most appropriate silent download mode according to different network conditions and user requirements.

What described above is just the preferred embodiments of the present disclosure and is not intended to limit the present disclosure; any modification, equivalent replacement and improvement made within the principles of the present disclosure shall be included in the scope of the present disclosure.

What is claimed is:

1. A method for downloading games, comprising:
at a client device, sending a version number of a local game hall and personal information of a user to a server;
receiving a silent configuration file for downloading from the server, the silent configuration file being generated by the server according to the version number of the local game hall and the personal information of the user, and the silent configuration file for downloading comprising a list of games that needs to be updated and/or downloaded and a silent download speed-limiting mode; and
silently downloading and/or updating corresponding games of the local game hall according to the silent configuration file for downloading, where is step comprises:

downloading the game in a silent download mode according to the silent configuration file for downloading when the user is in an idle condition;

performing a dynamic adjustment of the silent download according to a game-playing status of the user.

2. The method according to claim 1, wherein performing a dynamic adjustment of the silent download according to a game-playing status of the user comprises:
   a) downloading the game at a full speed when the user is in an idle condition;
   b) immediately suspending ongoing silent download and ensuring an initiative download to complete when the user triggers an initiative download;
   c) downloading games by using a narrower bandwidth according to the silent download speed-limiting mode when the user is playing games, ensuring fluency of playing the game; or
   d) restoring the silent download when the user cancels/finishes an initiative download or ends playing of the game.

3. The method according to claim 2, wherein the silent download speed-limiting mode comprises:
   (1) setting a maximum download speed, namely, the maximum speed set by the local game hall, with which a data package is received via the TCP connection;
   (2) setting an occupation ratio of bandwidth, namely, downloading at first for a period of time without speed limits to detect a maximum download speed that is currently available, and further setting a silent download speed according to the maximum download speed and the occupation ratio of bandwidth; and
   (3) setting a download completion time, namely, setting the silent download speed according to file size to be downloaded and download completion time.

4. A client device for downloading games, comprising:
   a game information sending module configured to upload a version number of a local game hall and personal information of a user to a server;
   a configuration file for downloading receiving module configured to receive a silent configuration file for downloading sent by the server;
   a game verification module configured to perform verification on a local game according to the silent configuration file for downloading received by the configuration file for downloading receiving module; and
   a game processing module configured to update and/or download the local game according to the result of the verification performed by the game verification module,
   wherein the game processing module comprises:
      a silent download launching module configured to launch a silent download mode to download the game according to the result of the verification performed by the game verification module when the user is in an idle condition;
      a silent download dynamic adjustment module configured to perform a dynamic adjustment of the silent download mode according to a game-playing status of the user when the silent download launching module launches the silent download mode to download the game.

5. A system for downloading games, comprising at least one client device according to claim 4 and one server device for downloading games comprising:
   a game information receiving module configured to receive personal information of a user and a version number of a local game hall sent by a client device;
   a configuration file for downloading generating module configured to generate a silent configuration file for downloading according to the version number of the local game hall and the personal information of the user received by the game information receiving module, wherein the silent configuration file for downloading comprises a list of games that needs to be updated and/or downloaded and a silent download speed-limiting mode; and
   a configuration file for downloading sending module configured to send the silent configuration file for downloading generated by the configuration file for downloading generating module to the client device.

* * * * *